United States Patent [19]

Dvorak

[11] Patent Number: 5,170,689
[45] Date of Patent: Dec. 15, 1992

[54] METAL WORKING MACHINE

[76] Inventor: Jim Dvorak, P.O. Box 155, Cosmos, Minn. 55228

[21] Appl. No.: 702,887

[22] Filed: May 20, 1991

[51] Int. Cl.$^5$ .............................................. B26D 9/00
[52] U.S. Cl. .................................... 83/515; 83/197; 83/200; 83/518; 83/599; 83/609; 83/821; 83/859
[58] Field of Search ............... 83/518, 519, 517, 516, 83/515, 514, 513, 549, 598, 604, 605, 682, 859, 197, 692, 693, 694, 523, 599, 609, 200, 821

[56] References Cited

U.S. PATENT DOCUMENTS

| | | | |
|---|---|---|---|
| 244,488 | 7/1881 | Schneekloth | 83/515 |
| 271,277 | 1/1883 | Sailer | 83/598 |
| 523,984 | 8/1894 | Hayden | 83/605 |
| 571,919 | 11/1896 | Golding | 83/599 X |
| 1,200,802 | 10/1916 | Berry | 83/643 |
| 3,263,541 | 8/1966 | Stockard, Jr. | 83/197 |
| 3,347,124 | 10/1967 | Domeny | 83/609 |
| 3,780,610 | 12/1973 | Zadow | 83/643 |
| 3,941,021 | 3/1976 | Meinholdt | 83/644 |
| 3,948,134 | 4/1976 | Mori | 83/643 |
| 4,457,197 | 7/1984 | Wepner | 83/197 |
| 4,567,800 | 1/1986 | Carboniero | 83/518 X |
| 4,907,481 | 3/1990 | Dvorak | 83/571 |

FOREIGN PATENT DOCUMENTS 0683861  9/1979  U.S.S.R. .................. 83/605

Primary Examiner—Frank T. Yost
Assistant Examiner—Clark F. Dexter
Attorney, Agent, or Firm—Peterson, Wicks, Nemer & Kamrath

[57] ABSTRACT

A metal working machine (10) is disclosed according to the preferred form including a punching station (48) associated with a first crank arm (18) pivotably mounted to the frame (12) by a first pivot pin (20) and including multiple shearing stations (50a–e) associated with a second crank arm (26) pivotably mounted to the frame (12) by a second pivot pin (28). A link (36) has its opposite ends pivotably mounted by pivot pins (38, 40) to the first and second crank arms (18, 26), respectively. An expandable and contractable actuator (42) having its opposite ends pivotably mounted by pivot pins (44, 46) to the first and second crank arms (18, 26) simultaneously pivots the crank arms (18, 26) about the first and second pivot pins (20, 28) in opposite directions. The pivot pins (20, 28, 38, 40, 44, 46) are spaced from and parallel to each other. The force is transferred to the crank arm (18, 26) associated with the working station (48, 50a–e) being utilized by the actuator (42) directly pushing on that crank arm and by the link (36) acting through the other crank arm being pivoted in the opposite direction by the actuator (42). In the preferred form, a wing (60) and an arcuate ear (62) are integrally formed with and in the plane of the second crank arm (26) and extend beyond the shearing edges (56, 58) of the shearing station (50e). The wing (60) is spaced from the second pivot pin (28) and the arcuate ear (62) extends concentrically around the second pivot pin (28).

17 Claims, 1 Drawing Sheet

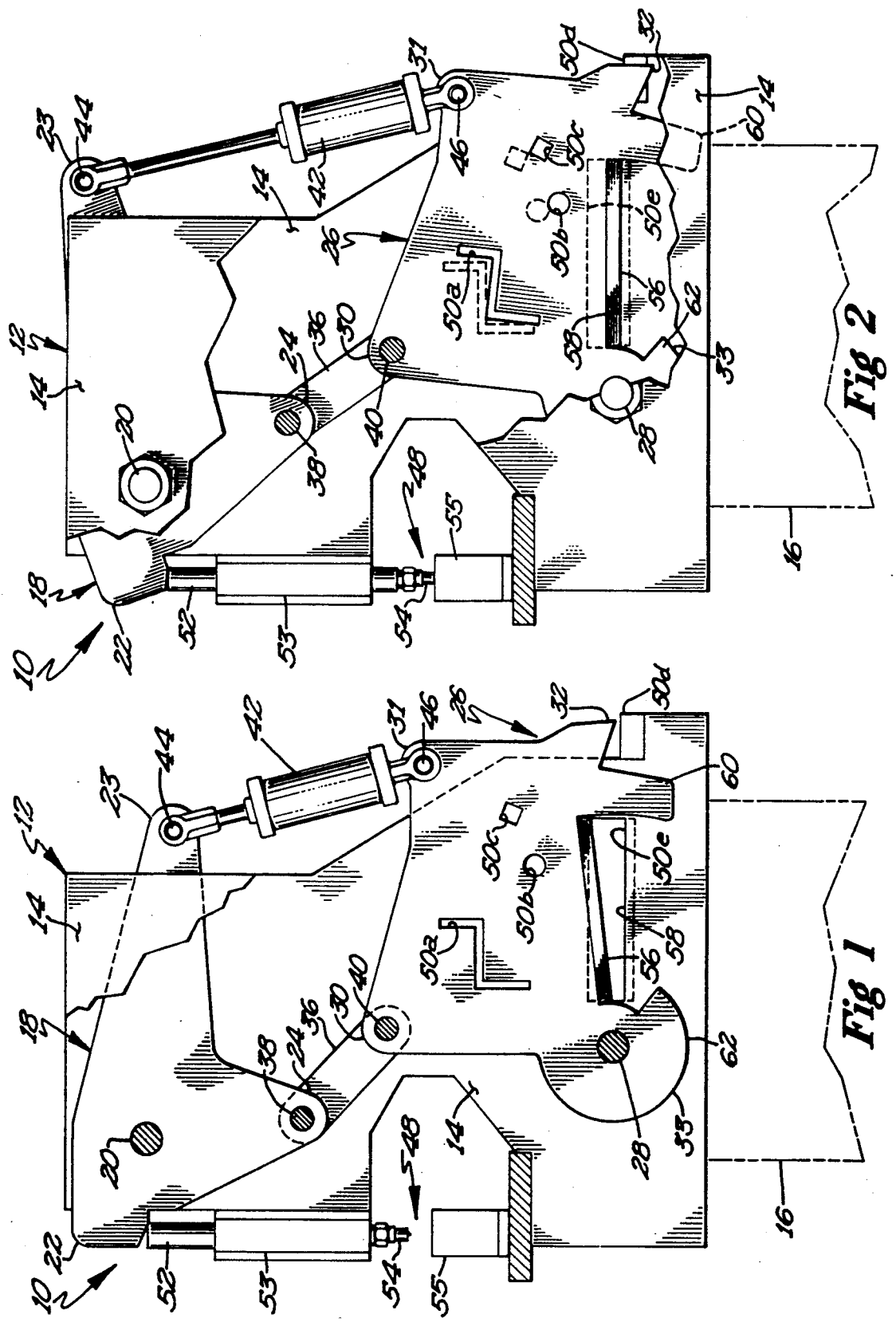

METAL WORKING MACHINE

BACKGROUND

The present invention generally relates to machines for shearing and/or punching material such as metal (i.e. iron and steel) of various configurations, and particularly to a material working machine placing greater cutting forces on the material than prior machines utilizing the same size of force actuators.

Metal working apparatus having combined shearing and punching stations has become quite common. Typically, the apparatus is powered by a hydraulic actuator which moves the working member relative to the work piece. It can then be appreciated that the cutting forces placed on the work piece by the working member is a function of the force exerted by the hydraulic actuator and any leverage advantages utilized. Thus, the size of the material which can be sheared or punched is limited by the strength of the components of the machine itself and the size of the hydraulic actuator utilized. Further, the size of hydraulic actuator affects the mass, cost, as well as the operational expense of the machine. Thus, there is a continuing desire and need for a machine for shearing and/or punching material which maximizes material size capabilities, shearing efficiencies, and machine life while minimizing power requirements.

SUMMARY

The present invention solves this need and other problems in the field of material working by providing, in the most preferred form, first and second crank arms pivotably mounted about spaced, parallel, stationary first and second pivot axes and a link having opposite ends pivotably connected to the first and second crank arms about spaced, parallel, third and fourth pivot axes which are also spaced and parallel to the first and second pivot axes, with work stations associated with the crank arms working material as the crank arms are simultaneously pivoted about the first and second pivot axes in opposite directions.

In a further aspect of the present invention, a wing is integrally formed with the first blade of a shearing device spaced from the pivot axis of the first and second blades and extending in the plane of the first blade beyond the shearing edges of the first and second blades and is slideably sandwiched in the shearing pivot plane to prevent movement of the first blade out of the shearing pivot plane while shearing material between the shearing edges of the first and second blades.

It is thus an object of the present invention to provide a novel machine for shearing and/or punching material.

It is further an object of the present invention to provide such a novel machine for working metal.

It is further an object of the present invention to provide such a novel machine developing a distinct power advantage at the work stations.

It is further an object of the present invention to provide such a novel machine utilizing a unique leverage and linkage arrangement to transfer increased force to the material being worked.

It is further an object of the present invention to provide such a novel machine which maximizes material size capabilities while minimizing power requirements.

It is further an object of the present invention to provide such a novel machine which reduces wear forces between the pivot pin and the aperture in the shearing blade receiving the pivot pin caused by shearing forces which tend to separate the shearing edges of the shearing blades.

It is further an object of the present invention to provide such a novel machine which prevents movement of the shearing blades out of the shearing pivot plane.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIGS. 1 and 2 show front views of a metal working machine according to the preferred teachings of the present invention in non-operative and operative positions, respectively, with portions broken away and shown in phantom to reveal internal constructions.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "horizontal", "vertical", "upper", "lower", "longitudinal", "lateral", and similar terms are used herein, it should be understood that these terms have reference only to the structure shown in the drawings as it would appear to a person viewing the drawings and are utilized only to facilitate describing the invention.

DESCRIPTION

A metal working machine according to the preferred teachings of the present invention is shown in the drawings and generally designated 10. Machine 10 generally includes a frame 12 formed of two parallel, spaced housing plates 14 held in a vertical orientation by a suitable base 16. An upper crank arm 18 is pivotably mounted between plates 14 by a horizontal pivot pin 20. In the most preferred form, crank arm 18 is generally triangular in shape including first, second, and third corners 22, 23, and 24. In the preferred form, pivot pin 20 is spaced from corners 22, 23, and 24 but adjacent to corner 22. A lower crank arm 26 is pivotably mounted between plates 14 by a pivot pin 28 spaced from and parallel to pivot pin 20. In the most preferred form, crank arm 26 is generally rectangular in shape including first, second, third, and fourth corners 30, 31, 32, and 33. In the preferred form, pivot pin 28 is located at corner 33 of crank arm 26. A link 36 includes an upper end pivotably mounted by pivot pin 38 at corner 24 of crank arm 18 and an opposite, lower end pivotably mounted by pivot pin 40 at corner 30 of crank arm 26. An extendable and contractable member shown as a double acting piston-cylinder hydraulic actuator 42 includes an upper end pivotably mounted by pivot pin 44 at corner 23 of crank arm 18 and a lower end pivotably mounted by pivot pin 46 at corner 31 of crank arm 26.

Pivot pins 20, 28, 38, 40, 44, and 46 are spaced from and parallel to each other. Pivot pin 20 is located longitudinally, which in the preferred form is vertically above, and laterally, which in the preferred form is horizontally, over from pivot pin 28. Pivot pin 38 is located intermediate pivot pins 20 and 44 and spaced below a line passing through pivot pins 20 and 44, and is located longitudinally (vertically) and laterally (horizontally) intermediate pivot pins 20 and 28. Pivot pin 40 is located intermediate pivot pins 28 and 46 and spaced above a line passing through pivot pins 28 and 46 and is located longitudinally (vertically) intermediate pivot pins 20 and 28 and laterally (horizontally) on the opposite side of pivot pin 28 than pivot pin 20.

As is customary, machine 10 includes both a punching station 48 and a shearing station which in the most preferred form includes an angle shearing station 50a, a round rod shearing station 50b, a square rod shearing station 50c, a notching station 50d, and a bar shearing station 50e. Generally stations 50a–50e are associated with crank arm 26 and include shearing blades formed in or attached to crank arm 26 adapted to be displaced between work receiving windows formed in plates 14. Generally, punching station 48 is associated with crank arm 18 and includes a ram 52 which is slideably mounted by a guide 53 secured to frame 12, with ram 52 having a male punch 54 which coacts with a female die 55 secured to frame 12. Corner 22 of crank arm 18 includes suitable provisions for abutting with the upper end of ram 52 such that as crank arm 18 pivots about pivot pin 20, ram 52 moves downwardly with downward movement of corner 22 and moves upwardly with upward movement of corner 22.

Now that the basic construction of machine 10 according to the preferred teachings of the present invention has been explained, the operation and subtle features of machine 10 can be set forth and appreciated. When using punching station 48, as actuator 42 extends simultaneously pivoting crank arms 18 and 26 in opposite directions, an upward force is transferred from actuator 42 pushing pivot pin 44 upwardly to pivot crank arm 18 about pivot pin 20 moving ram 52 downwardly. Further, a downward force is transferred from actuator 42 to pivot pin 46 pushing crank arm 26 to simultaneously pivot about pivot pin 28. It can then be appreciated that as crank arm 26 pivots about pivot pin 28, it also transfers power to crank arm 18 through the pivotal connection of link 36 between crank arms 18 and 26, with link 36 pulling on crank arm 18 through pivot pin 38.

Similarly, when using one of the shearing stations 50a–e, as actuator 42 extends, power is transferred from actuator 42 pushing pivot pin 46 downwardly to pivot crank arm 26 about pivot pin 28. Further, power is transferred from actuator 42 to pivot pin 44 pushing crank arm 18 to also pivot about pivot pin 20. It can then be appreciated that as crank arm 18 pivots about pivot pin 20, it also transfers power to crank arm 26 through the pivotal connection of link 36 between crank arms 18 and 26, with link 36 pushing on crank arm 26 through pivot pin 40.

It can then be appreciated that link 36 according to the teachings of the present invention develops a distinct power advantage for punching station 48 and shearing stations 50a–e as actuator 42 extends and pivot pins 20, 38, and 40 approach a linear relation, with the closer pivot pins 20, 38, and 40 approach a linear relation, the better the advantage that is gained in transferring power to punching station 48 and shearing stations 50a–e. It should be appreciated that with pivot pins 20, 38, and 40 in a linear relation, link 36 can lock crank arms 18 and 26 in position preventing pivotal movement of crank arms 18 and 26 by the retraction of actuator 42. Thus, machine 10 is arranged such that pivot pins 20, 38, and 40 are very close to being but not exactly linear with actuator 42 in its fully extended condition to prevent potential locking.

It can be further appreciated that the cutting force placed on the material being punched in punching station 48 or being sheared in one of the shearing stations 50a–e is substantially increased over prior metal working machines having the same size actuator due to the leverage advantage gained by crank arms 18 and 26 pivoting about pivot pins 20 and 28 and also due to the power advantage developed through link 36. Thus, machine 10 according to the teachings of the present invention is able to work material of stronger stock while minimizing the size of actuator 42 needed.

Shearing of bars is performed in shearing station 50e by pivoting first blade, i.e. crank arm 26 including beveled shearing edge 56 past second blade, i.e. plate 14 including beveled shearing edge 58, in the preferred form. As in all bar shearing devices, there is a natural tendency for edges 56 and 58 to be forced apart as crank arm 26 pivots from its first, open position with shearing edges 56 and 58 extending at an open angle from each other to its second, shearing position with shearing edges 56 and 58 at least abutting each other, such forces resulting in wear on pivot pin 28 and the aperture in crank arm 26 receiving pivot pin 28. Machine 10 according to the preferred teachings of the present invention includes provisions for preventing movement of crank arm 26 out of the pivot plane with reference to plate 14 including shearing edge 58. Specifically, crank arm 26 includes an integrally formed wing 60 spaced from pivot pin 28 and extending in the plane of crank arm 26 beyond shearing edge 56 and beyond shearing edge 58 of plate 14. Further, in the most preferred form, crank arm 26 further includes an arcuate ear 62 integrally formed with crank arm 26 extending concentrically around pivot pin 28 in the plane of crank arm 26 beyond shearing edge 56 and also extending beyond shearing edge 58 of plate 14. Machine 10 further includes provisions for slideably sandwiching wing 60 and ear 62 in the pivot plate of crank arm 26 where shearing edges 56 and 58 are in a shearing relation and particularly for slideably sandwiching wing 60 and ear 62 against plate 14 of frame 12 including edge 58. Particularly, in the preferred form, the other plate 14 of frame 12 on the side opposite crank arm 26 than plate 14 of frame 12 including edge 58 slideably sandwiches wing 60 and ear 62 and in the most preferred form, includes wears plates which slideably abut against wing 60 and ear 62. It can also be appreciated that plate 14 opposite plate 14 of frame 12 including edge 58 can also include similar wear plates such as adjacent pivot pin 40 to further assist wing 60 and ear 62 from preventing crank arm 26 from moving out of its shearing pivot plane. Thus, wing 60 and ear 62 are advantageous in providing better shearing operation as crank arm 26 is prevented from pivoting out of the shearing plane and separating shearing edges 56 and 58. Further, less stress is placed upon pivot pin 28 and the aperture in crank arm 26 receiving pivot pin 28 resulting in less wear such that pivot pin 28 and the aperture in crank arm 26 receiving pivot pin 28 tends to better hold crank arm 26 in its shearing pivot plane even after extended use of machine 10 according to the teachings of the prevent invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A metal working machine comprising, in combination: a first crank arm pivotably mounted about a first pivot axis and having a free corner; a second crank arm pivotably mounted about a second pivot axis spaced from and parallel to the first pivot axis and having a free corner; a link having a first end pivotably mounted to the first crank arm about a third pivot axis parallel to and spaced from the first and second pivot axes and having a second end pivotably mounted to the second crank arm about a fourth pivot axis parallel to and spaced from the first, second, and third pivot axes; means connected between the free corners of the first and second crank arms for changing the spacing between the free corners of the first and second crank arms to simultaneously pivot the first and second crank arms about the first and second pivot axes in opposite directions; and at least one working station associated with one of the first and second crank arms.

2. The metal working machine of claim 1 wherein the pivot axes are horizontal, with the first pivot axis located vertically above the second pivot axis.

3. A metal working machine comprising, in combination: a first crank arm pivotably mounted about a first pivot axis; a second crank arm pivotably mounted about a second pivot axis spaced from and parallel to the first pivot axis; a link having a first end pivotably mounted to the first crank arm about a third pivot axis parallel to and spaced from the first and second pivot axes and having a second end pivotably mounted to the second crank arm about a fourth pivot axis parallel to and spaced from the first, second, and third pivot axes; means for simultaneously pivoting the first and second crank arms about the first and second pivot axes in opposite directions; and at least one working station associated with one of the first and second crank arms; wherein the simultaneously pivoting means comprises an expandable and contractable actuator having a first end pivotably mounted to the first crank arm about a fifth pivot axis parallel to and spaced from the first, second, third and fourth pivot axes and a second end pivotably mounted to the second crank arm about a sixth pivot axis parallel to and spaced from the first, second, third, fourth and fifth pivot axes.

4. The metal working machine of claim 3 wherein the first, third, and fifth pivot axes are arranged in a triangular configuration, with the third pivot axis located intermediate the first and fifth pivot axes.

5. The metal working machine of claim 4 wherein the second, fourth, and sixth pivot axes are arranged in a triangular configuration, with the fourth pivot axis located intermediate the second and sixth pivot axes.

6. The metal working machine of claim 5 wherein the third pivot axis is spaced longitudinally and laterally between the first and second pivot axes.

7. The metal working machine of claim 6 wherein the second pivot axis is located laterally between the third and fourth pivot axes.

8. The metal working machine of claim 7 wherein the pivot axes are horizontal, with the first pivot axis located vertically above the second pivot axis.

9. The metal working machine of claim 8 wherein the working station is a punching station including a slideably mounted ram having a punch, with the first crank arm abutting with and sliding the ram.

10. The metal working machine of claim 8 wherein the working station is a shearing station, with the second crank arm including a shearing blade movable with respect to a stationary work receiving window.

11. A metal working machine comprising, in combination: a first crank arm pivotably mounted about a first pivot axis; a second crank arm pivotably mounted about a second pivot axis spaced from and parallel to the first pivot axis; a link having a first end pivotably mounted to the first crank arm about a third pivot axis parallel to and spaced from the first and second pivot axes and having a second end pivotably mounted to the second crank arm about a fourth pivot axis parallel to and spaced from the first, second, and third pivot axes; means for simultaneously pivoting the first and second crank arms about the first and second pivot axes in opposite directions; and at least one working station associated with one of the first and second crank arms; wherein the third pivot axis is spaced vertically and horizontally between the first and second pivot axes and wherein the second pivot axis is located horizontally between the third and fourth pivot axes.

12. A metal working machine comprising, in combination: a first crank arm pivotably mounted about a first pivot axis; a second crank arm pivotably mounted about a second pivot axis spaced from and parallel to the first pivot axis; a link having a first end pivotably mounted to the first crank arm about a third pivot axis parallel to and spaced from the first and second pivot axes and having a second end pivotably mounted to the second crank arm about a fourth pivot axis parallel to and spaced from the first, second, and third pivot axes; means for simultaneously pivoting the first and second crank arms about the first and second pivot axes in opposite directions; and at least one working station associated with one of the first and second crank arms; wherein the second pivot axis is located horizontally between the third and fourth pivot axes.

13. A metal working machine comprising, in combination: a first crank arm pivotably mounted about a first pivot axis; a second crank arm pivotably mounted about a second pivot axis spaced from and parallel to the first pivot axis; a link having a first end pivotably mounted to the first crank arm about a third pivot axis parallel to and spaced from the first and second pivot axes and having a second end pivotably mounted to the second crank arm about a fourth pivot axis parallel to and spaced from the first, second, and third pivot axes; means for simultaneously pivoting the first and second crank arms about the first and second pivot axes in opposite directions; and at least one working station associated with one of the first and second crank arms; wherein the second crank arm includes a first shearing edge pivotally movable relative to a second, stationary shearing edge about the second pivot axis in a pivot plane between a first, open position with the first and second shearing edges extending at an open angle from each other and a second, shearing position with the first and second shearing edges at least abutting each other; wherein the metal working machine further comprises, in combination: a wing integrally formed with the second crank arm spaced from the second pivot axis and extending in the plane of the second crank arm beyond the first shearing edge and extending beyond the second shearing edge; and means for slideably sandwiching the wing in the pivot plane for preventing movement of the second crank arm out of the pivot plane.

14. The metal working machine of claim 13 further comprising, in combination: an arcuate ear integrally formed with the second crank arm extending concentrically around the second pivot axis in the plane of the second crank arm beyond the first shearing edge and extending beyond the second shearing edge; and means for slideably sandwiching the arcuate ear in the pivot plane.

15. In a shearing device including a first elongated blade having a shearing edge and a second elongated blade having a shearing edge, with the first elongated blade being pivotably mounted to the second elongated blade about a pivot axis and pivotable about the pivot axis in a pivot plane in a shearing direction between a first, open position with the shearing edges of the first and second blades extending at an open angle from each other and a second, shearing position with the shearing edges of the first and second blades at least abutting each other, the improvement comprising means for preventing movement of the first elongated blade out of the pivot plane comprising, in combination: a wing integrally formed with the first blade spaced from the pivot axis and extending in the shearing direction in the plane of the first blade beyond the shearing edge of the first blade and extending beyond the shearing edge of the second blade in the first and second positions; means for slideably sandwiching the wing against the second blade in the pivot plane; an arcuate ear integrally formed with the first blade extending concentrically around the pivot axis in the plane of the first blade beyond the shearing edge of the first blade and extending beyond the shearing edge of the second blade; and means for slideably sandwiching the arcuate ear in the pivot plane.

16. The shearing device of claim 15 wherein the arcuate ear slideably sandwiching means comprises means for slideably sandwiching the ear against the second blade.

17. The shearing device of claim 16 wherein the second blade is stationary and wherein the slideably sandwiching means comprises a plate positioned spaced from and parallel to the second blade, with the first blade located and pivotably mounted between the second blade and the plate.

* * * * *